(12) United States Patent
Rehage et al.

(10) Patent No.: US 11,098,758 B2
(45) Date of Patent: *Aug. 24, 2021

(54) DEVICE FOR ROTATIONALLY AND TRANSLATIONALLY MOVING AN OBJECT

(71) Applicant: PAUL HETTICH GMBH & CO. KG, Kirchlengern (DE)

(72) Inventors: Daniel Rehage, Chemnitz (DE); Andreas Matthes, Chemnitz (DE); Ulrich Siegert, Limbach-Oberfrohna (DE); Bernd Lehmann, Chemnitz (DE); Mathias Winkler, Chemnitz (DE); Gottfried Fiedler, Hohenstein-Ernstthal (DE); Hartmut Enderlein, Chemnitz (DE)

(73) Assignee: PAUL HETTICH GMBH & CO. KG, Kirchlengern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/495,478

(22) PCT Filed: Mar. 21, 2018

(86) PCT No.: PCT/EP2018/057148
§ 371 (c)(1),
(2) Date: Sep. 19, 2019

(87) PCT Pub. No.: WO2018/172404
PCT Pub. Date: Sep. 27, 2018

(65) Prior Publication Data
US 2020/0018349 A1    Jan. 16, 2020

(30) Foreign Application Priority Data
Mar. 22, 2017   (DE) .......................... 102017106170.3

(51) Int. Cl.
*F16C 31/06*     (2006.01)
*F16C 33/60*     (2006.01)
(Continued)

(52) U.S. Cl.
CPC .............. *F16C 31/06* (2013.01); *F16C 33/60* (2013.01); *A47B 49/004* (2013.01); *A47B 57/583* (2013.01)

(58) Field of Classification Search
CPC ..... A47B 49/004; A47B 77/10; A47B 96/025; A47B 81/002; A47B 96/04; A47B 37/00;
(Continued)

(56) References Cited

U.S. PATENT DOCUMENTS

| 535,886 A | * | 3/1895 | Brand | ..................... F04D 25/08 |
| | | | | 5/173 |
| 2,316,408 A | * | 4/1943 | Dawson | .................. F16H 25/14 |
| | | | | 74/55 |

(Continued)

FOREIGN PATENT DOCUMENTS

| DE | 964458 | 5/1957 |
| DE | 1198636 | 8/1965 |

(Continued)

OTHER PUBLICATIONS

Search Report issued in German App. No. 102017106170.3 (2018).
Search Report issued in Int'l App. No. PCT/EP2018/057148 (2018).

*Primary Examiner* — Hanh V Tran
(74) *Attorney, Agent, or Firm* — Barnes & Thornburg LLP

(57) ABSTRACT

A device for rotationally and translationally moving an object comprising a flat storage area relative to a storage area of a support plate arranged plane-parallel to the storage area, wherein: the object can be rotated relative to the support plate in one of two possible opposing rotational directions (Continued)

and can be displaced in a predefined direction; mutually facing bearing surfaces of the storage areas each have closed peripheral raceway grooves in which rolling elements are guided; the raceway grooves are formed such that, when a force is applied to the object in a direction defined in the plane of the storage area, the object can be moved, in a movement which is at least partially forcibly guided and which is simultaneously rotational and translational, from a starting position into an intermediary position, the object being rotated relative to the support plate in one of two possible opposing rotational directions and being displaced in a predefined direction; and the object, after being moved into the intermediary position, can further be rotated relative to the support plate in the one of two possible opposing rotational directions and can be displaced counter to the predefined direction, and, when rotated by 180°, resumes the base position.

15 Claims, 6 Drawing Sheets

(51) Int. Cl.
*A47B 49/00* (2006.01)
*A47B 57/58* (2006.01)

(58) Field of Classification Search
CPC ........... A47B 96/027; A47B 83/045; A47B 2037/005; F25D 25/024; F25D 25/027
See application file for complete search history.

(56) References Cited

U.S. PATENT DOCUMENTS

| | | | | |
|---|---|---|---|---|
| 2,540,125 A * | 2/1951 | Kolks | ............... | F16H 25/14 74/55 |
| 2,647,812 A * | 8/1953 | Saunders | ............... | F25D 25/027 312/294 |
| 2,840,438 A * | 6/1958 | Sharpe | ............... | F25D 25/027 312/322 |
| 2,936,205 A * | 5/1960 | Clark | ............... | F25D 25/027 312/302 |
| 3,107,959 A * | 10/1963 | Maxwell, Jr. | ........... | F25D 25/02 312/322 |
| 4,124,262 A * | 11/1978 | Schill | ............... | A47B 49/004 16/378 |
| 4,392,628 A * | 7/1983 | Hadfield | ............... | A47B 49/004 211/144 |
| 4,582,372 A * | 4/1986 | Cooper | ............... | A47B 46/00 108/140 |
| 6,322,679 B1 * | 11/2001 | De Bosscher | ...... | H01J 37/3408 204/192.12 |
| 6,585,119 B2 * | 7/2003 | Palder | ............... | A47F 5/02 211/163 |
| 7,147,445 B2 * | 12/2006 | Krayer | ............... | F16N 13/20 418/150 |
| 9,022,495 B1 * | 5/2015 | Conner, Sr. | ........... | F25D 25/027 312/408 |
| 9,052,134 B1 * | 6/2015 | Batchler | ............... | F25D 25/02 |
| 9,528,753 B1 * | 12/2016 | Conner, Sr. | ............... | A47F 3/08 |
| 2002/0117943 A1 * | 8/2002 | Gerkey | ............... | A47B 49/006 312/238 |
| 2005/0196310 A1 * | 9/2005 | Krayer | ............... | A47B 81/002 418/61.3 |
| 2009/0079305 A1 * | 3/2009 | Hirayoshi | ............... | A47B 46/00 312/209 |
| 2010/0176074 A1 * | 7/2010 | Andersen | ............... | A47F 5/0087 211/59.2 |
| 2017/0184335 A1 * | 6/2017 | Jeon | ............... | F25D 23/04 |
| 2020/0170408 A1 * | 6/2020 | Rehage | ............... | A47B 96/025 |
| 2020/0187641 A1 * | 6/2020 | Rehage | ............... | A47B 49/004 |
| 2020/0191471 A1 * | 6/2020 | Rehage | ............... | A47B 49/004 |

FOREIGN PATENT DOCUMENTS

| | | |
|---|---|---|
| DE | 3809992 | 10/1989 |
| DE | 9300364 U | 5/1993 |
| FR | 2777490 | 10/1999 |
| WO | WO 87/04325 | 7/1987 |
| WO | WO 2005/065482 | 7/2005 |

* cited by examiner

DEVICE FOR ROTATIONALLY AND TRANSLATIONALLY MOVING AN OBJECT

CROSS-REFERENCE TO RELATED APPLICATIONS

This application is a U.S. nationalization under 35 U.S.C. § 371 of International Application No. PCT/EP2018/057148, filed Mar. 21, 2018, which claims priority to German Patent Application No. 102017106170.3, filed Mar. 22, 2017. The disclosures set forth in the referenced applications are incorporated herein by reference in their entireties.

BACKGROUND AND SUMMARY OF THE DISCLOSURE

The present disclosure is directed to a device for the rotational and translational movement of an object having a planar bearing region in relation to a bearing region, which is arranged plane-parallel to the bearing region of a carrier plate.

Such devices are used, for example, to improve accessibility to areas which are difficult to reach in a storage space or on a storage surface. The ability to reach, for example, objects deposited in the rear region of a storage space or a storage surface is often only possible to a very restricted extent. Storage spaces arranged in a particularly user-unfriendly manner, for example, above the head height of a person or below the knee height, can only be reached with difficulty.

Turning out or pivoting out a turntable which is installed in this storage space or on the storage surface appears reasonable to remedy these above-mentioned disadvantages.

In the devices known from the prior art, predominantly sequential rotational and translational movements are combined with one another, wherein these two types of movements generally run separately from one another and/or in succession. Such solutions are very technically complex. The rotational movement is frequently only possible to a restricted extent in this case, in particular only by 90°, which further obstructs the accessibility of the elements deposited in such storage spaces or on such storage surfaces. In addition, numerous solutions have weak points in the absorption of support forces and the stability and also large structural heights.

The present disclosure is directed to a device for the rotational and translational movement of an object in relation to a carrier plate.

A device according to the present disclosure for the rotational and translational movement of an object having a planar bearing region in relation to a bearing region, which is arranged plane-parallel to the bearing region, of a carrier plate, in which the object is rotatable in relation to the carrier plate in a first rotational direction and is displaceable in a predetermined direction, is distinguished in that bearing surfaces of the bearing regions facing toward one another each comprise closed, peripheral running grooves, in which roller bodies are guided.

The running grooves are shaped in such a manner that if a force acts on the object in a direction defined in the plane of the bearing region, the object is movable in an at least partially positively-guided, simultaneously rotational and translational movement from a base position into an intermediate position, in which the object is rotated in relation to the carrier plate in one of two possible opposing rotational directions and is displaced in a predetermined direction, wherein the object is pivotable in relation to the carrier plate after the movement into the intermediate position further in the one of two possible opposing rotational directions and is displaceable opposite to the predetermined direction and occupies the base position again upon a pivot by 180°. One advantageous intermediate position is located approximately at 90°. The object is rotatable by arbitrary angles in relation to the carrier plate.

The positively-guided, simultaneously rotational and translational movement between object and carrier plate may exist in a range between base position and shortly before reaching the intermediate position, which is advantageously at 90°, in each of the two possible opposing rotational directions. There can also be only one rotational movement in the range of the 90° position of the object in relation to the carrier plate.

Due to the bearing surfaces of the bearing regions equipped with the peripheral running grooves, which enable an at least partially simultaneous rotational and translational movement, the object is movable in a simple manner on the carrier plate.

The simple construction of this device by the introduction of the closed peripheral running grooves into the lower side of the object and into the upper side of the carrier plate reduces the production costs, enhances the robustness of the device, and is user-friendly to operate.

According to an embodiment, two closed, peripheral running grooves are introduced into one of the bearing regions and precisely one closed, peripheral running groove is introduced into the other of the bearing regions.

In this case, each of the three running grooves may have an at least similar profile, i.e., cross-sectional contour having similar base elements, wherein one of the two running grooves of the one bearing region is formed mirrored in relation to the running groove of the other bearing region and the other of the two running grooves is formed rotated by 180° and displaced by a predetermined amount in relation to the one of the two running grooves.

Using such a running groove contour, a simultaneously rotational and translational movement of the object in relation to the carrier plate which is simple to operate is enabled.

The roller bodies are formed as balls according to an embodiment, which enables a low-friction relative movement of the object in relation to the carrier plate.

To enable the support load on the individual roller bodies while maintaining a simple running groove design, four such roller bodies may be guided in the running grooves.

According to a further embodiment, the roller bodies are held, for example, captively, in a roller body cage. The positive guiding of the roller bodies during the movement in the running grooves is thus improved once again.

The bearing regions of the object or the carrier plate are formed in one piece with the carrier plate or the object, respectively, according to an embodiment.

In an alternative embodiment, at least one of the bearing regions is formed as a separate element, which is insertable into a correspondingly shaped receptacle in the carrier plate or the object, or which is attachable to the carrier plate or the object by connecting means.

According to a further embodiment, a guide, for example, a slot extending in the translational movement direction, is arranged on or in the one of the bearing regions and a guiding or holding element is arranged on or in the other bearing region. For example, a borehole is introduced into the one bearing region, in which a guiding and holding pin or bolt is accommodated. This also contributes to further improving the positive guiding. Moreover, the object and the carrier plate can thus be held on one another axially in a simple manner.

The closed peripheral running grooves are, according to a further embodiment, each introduced around the center point of the bearing region of the object and the bearing region of the carrier plate up to a front edge of the carrier plate in the direction of the translational movement of the object.

This enables a large contact surface. Furthermore, a particularly favorable load absorption results in this manner, which also enhances the stability of the entire device.

The running grooves may be designed so that the object does not protrude over a rear edge of the carrier plate in the direction of the translational movement of the object during the entire movement. This can be advantageous for many applications of a device according to the present disclosure. Furthermore, in this embodiment a tilt safeguard can be provided, preferably at the rear edge of the carrier plate, to prevent tilting of the object into an intermediate position.

For improved positioning of the object in the base position, the closed peripheral running grooves may have multiple catch points for the roller bodies in the base position, which are each reached after a rotation of the object by 180°.

A further simplification of the operability of the device is achieved in that the object is rotatable in relation to the carrier plate in a first rotational direction and in an opposing second rotational direction by arbitrary angles.

The carrier plate is installed recumbent according to an embodiment. However, it is also conceivable to install the carrier plate hanging or standing vertically.

Depending on the application, an object can also have more than one bearing region, preferably two bearing regions, for example, one bearing region on the upper side of the object and one bearing region on the lower side of the object. The object can thus interact with corresponding bearing regions in or on more than one carrier plate. In this case, one of the bearings can be embodied as a fixed bearing and the at least one additional bearing as a floating bearing. A corresponding embodiment is advantageous in particular in the case of tall objects to enhance the stability.

DETAILED DESCRIPTION OF THE DRAWINGS

In the following description of the figures, terms such as upper, lower, left, right, front, rear, etc. refer exclusively to the illustration and position selected by way of example in the respective figures of the carrier plate, the object, the bearing region, the roller bodies, the running groove, and the like. These terms are not to be understood as restrictive, i.e., these references can change due to different operating positions or mirror-symmetric design or the like.

Figure 1:
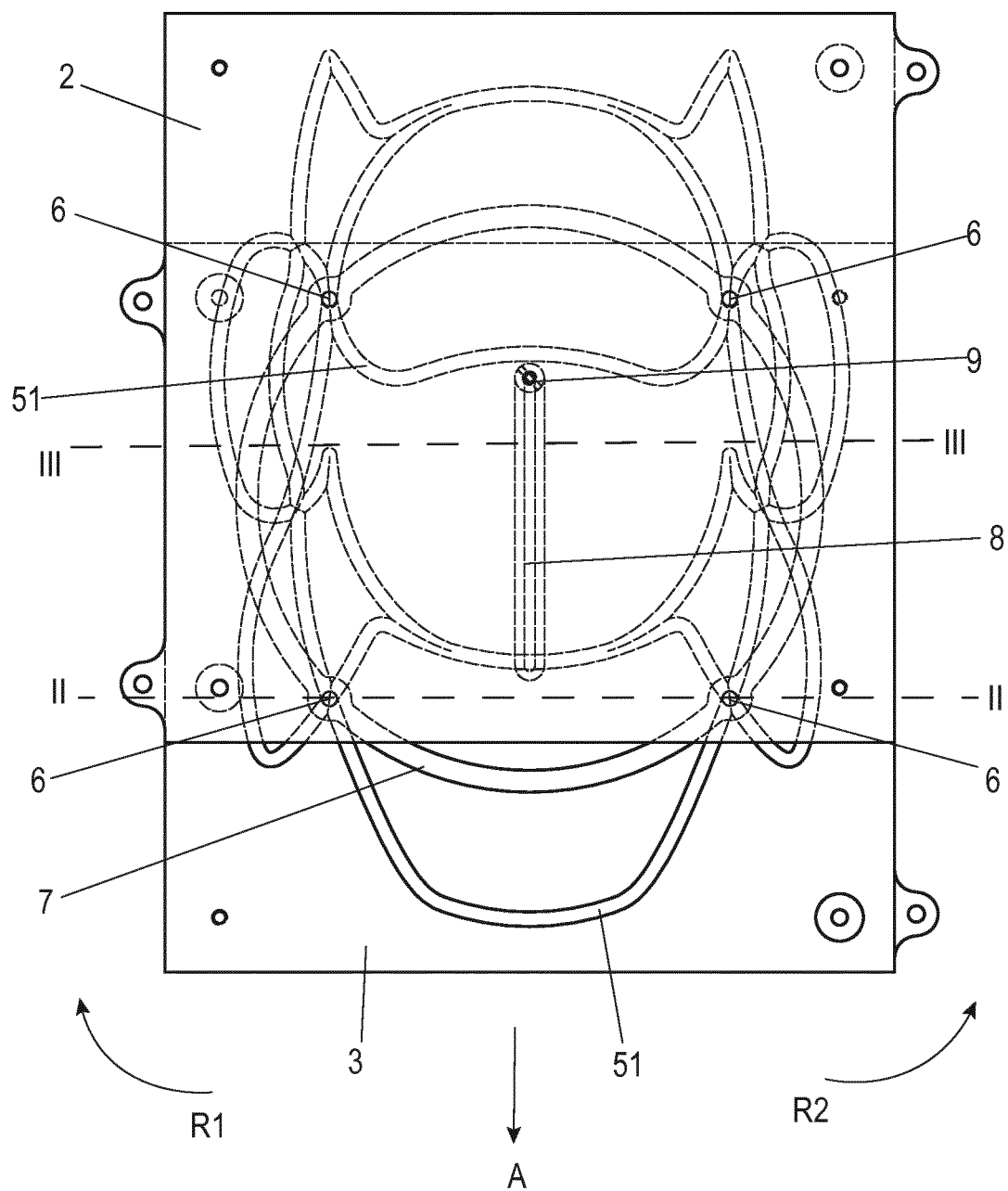
FIG. 1 shows a top view of an embodiment variant of a device according to the present disclosure.
Figure 2:
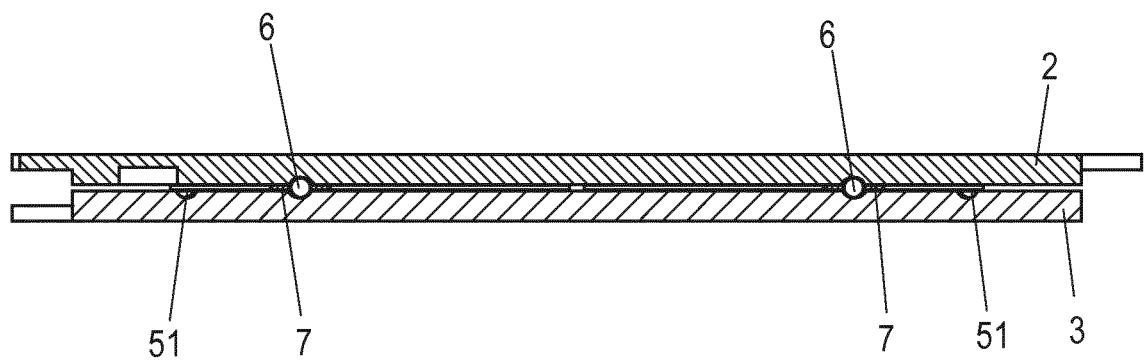
FIG. 2 shows a sectional view through a plane of a section identified by II in FIG. 1.
Figure 3:
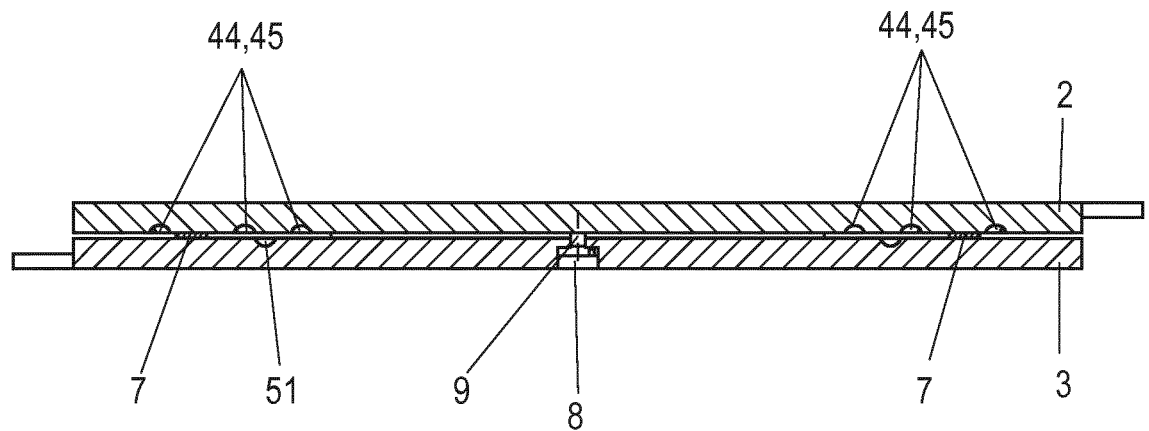
FIG. 3 shows a sectional view through a plane of a section identified by III in FIG. 1.

In FIG. 1, an object, in the form of a shelf here, which is mounted so it is rotationally and translationally movable on a carrier plate 3, is identified by the reference sign 2. In this case, respective bearing regions 4, 5 of the object 2 or the carrier plate 3, respectively, are provided for the bearing.

The bearing surfaces of these bearing regions 4, 5 facing toward one another each have closed, peripheral running grooves 44, 45, 51, in which roller bodies 6 are guided. The roller bodies 6 may be formed as balls in this case.

The running grooves 44, 45, 51 are shaped so that if a force acts on the object 2 in a predetermined direction A defined in the plane of the bearing region, the object 2 is movable in a positively-guided, simultaneously rotational and translational movement from a starting position into an intermediate position, in which the object 2 is rotated in relation to the carrier plate 3 in a rotational direction $R_1$ or a rotational direction $R_2$ and is displaced in the predetermined direction A.

In one intermediate position, the object 2 is pivoted by approximately 90° in relation to the base position, wherein the displacement reaches its maximum in the predetermined direction.

The object 2 can be moved back into the base position by it being rotated further in the rotational direction $R_1$. For this purpose, the object 2 is pivoted in relation to the carrier plate 3 by a total of 180° and displaced opposite to the predetermined direction A back into the base position.

Alternatively, the object 2 can be moved back into the base position by being rotated back opposite to the rotational direction $R_1$ in the rotational direction $R_2$.

Figure 4:
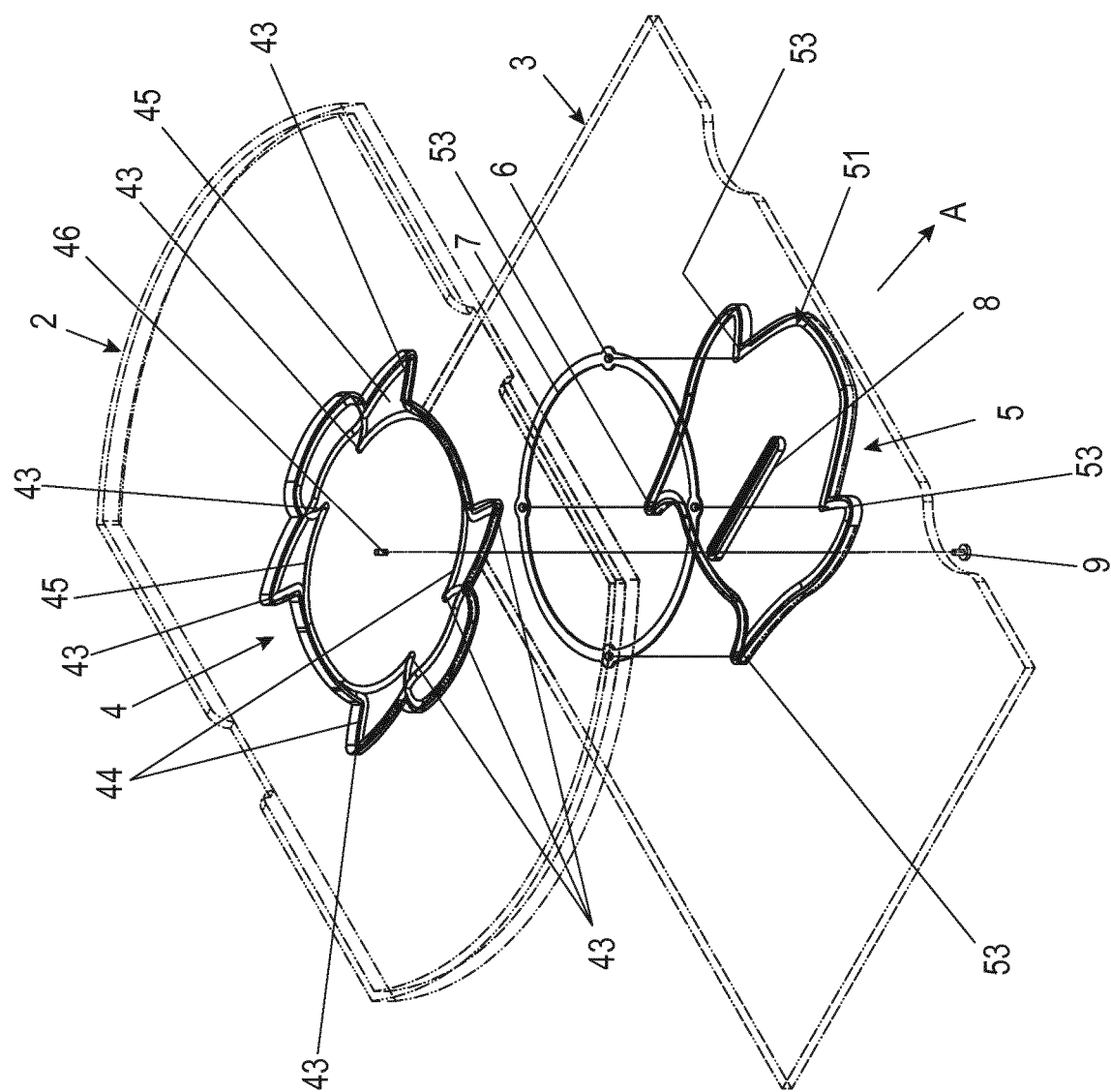
FIG. 4 shows a perspective exploded illustration of the device shown in FIG. 1.
Figure 5:
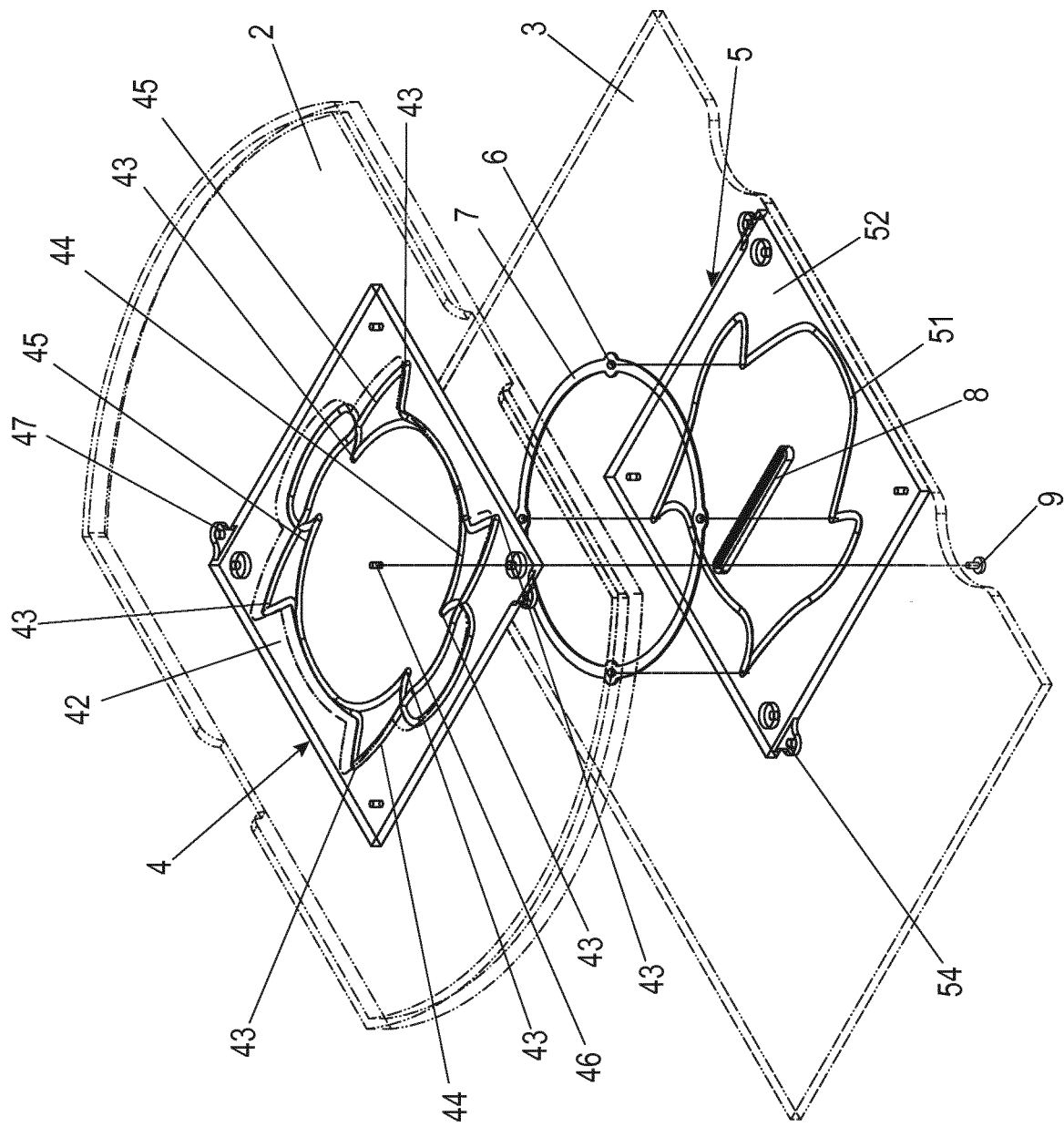
FIG. 5 shows a perspective exploded illustration of an alternative embodiment, in which the bearing regions are formed as separate elements.
Figure 6:
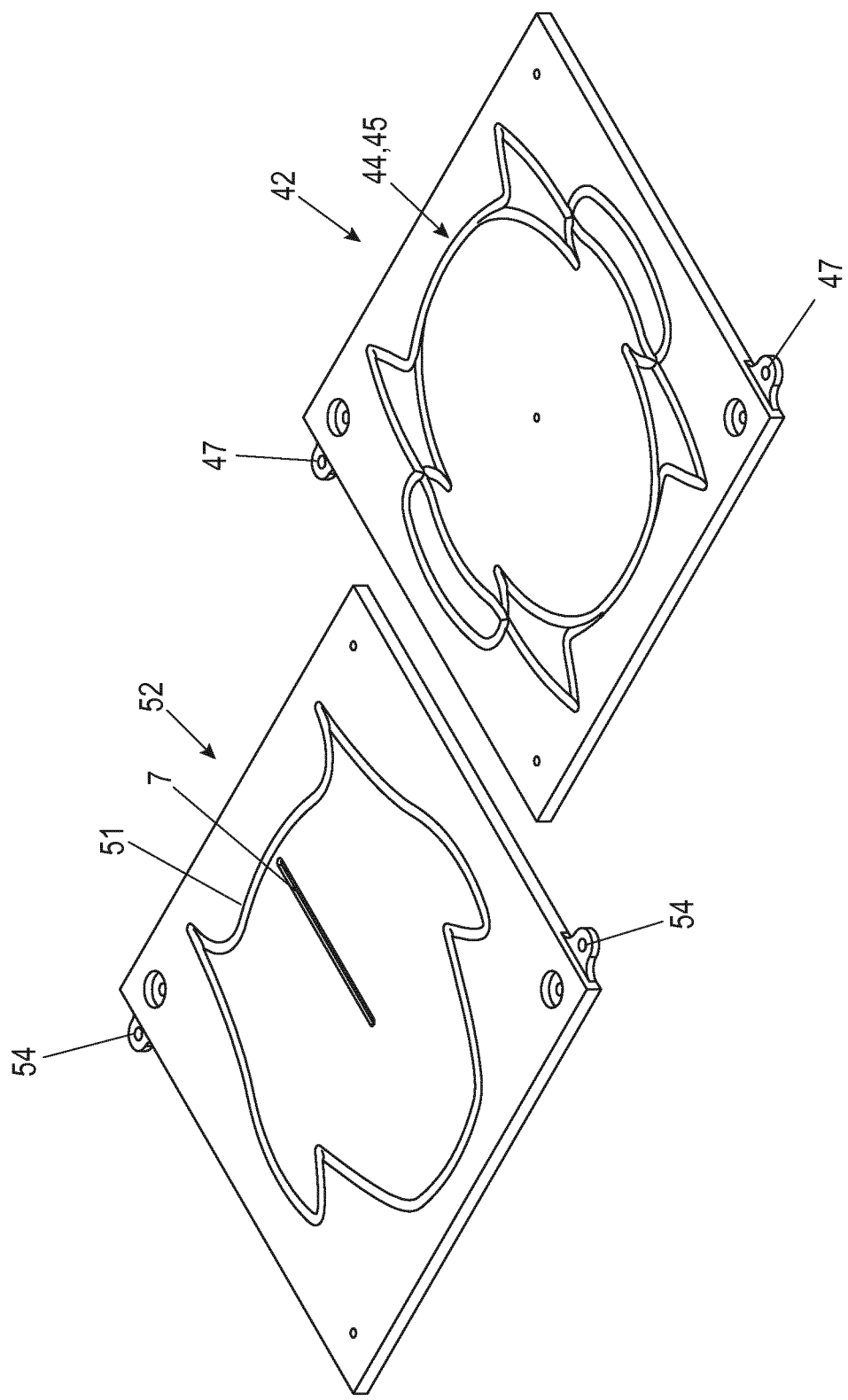
FIG. 6 shows a perspective illustration of the bearing regions formed as separate elements.

As shown in FIGS. 4 to 6, two closed, peripheral running grooves 44, 45 are introduced into the bearing region 4 of the object 2. Precisely one closed, peripheral running groove 51 is introduced into the bearing region 5 of the carrier plate 3.

The reverse arrangement is also conceivable, in which two running grooves are introduced into the bearing region 5 of the carrier plate 3 and one running groove is introduced into the bearing region 4 of the object 2.

The three running grooves 44, 45, 51 may be of identical cross section and similar form and have very similar basic elements. In this case, as can be seen well in FIGS. 4 and 5, one of the two running grooves 44 of the bearing region 4 of the object 2 is mirrored in relation to the running groove 51. The other of the two running grooves 45 is formed rotated by 180° in relation to the running groove 44 and displaced by the amount of the translational movement.

As is furthermore shown in FIGS. 2, 3, 4, and 5, the roller bodies 6, which are formed as balls here, are held in a roller body cage 7. The roller bodies 6 are preferably held captively in the roller body cage 7 in this case. It is also conceivable to solely guide the roller bodies in openings of the roller body cage 7 provided for this purpose.

For the axial fixing of the carrier plate 3 with the object 2, a guide 8 in the form of a slot extending in the translational movement direction A is introduced into the bearing region 5 of the carrier plate 3. A borehole 46 is introduced centrally into the bearing region 4 of the object 2. A guiding and holding element 9 in the form of a pin passes through the guide 8 and the borehole 46 in this case and thus ensures axial fixing of the object 2 on the carrier plate 3. If the carrier plate 3 and the object 2 resting thereon is installed horizontally, the axial safeguard can also be omitted. More than one axial safeguard or a differently embodied axial safeguard can also be provided.

While in the embodiment shown in FIG. 4, the bearing regions 4, 5 are formed in one piece with the object 2 or the carrier plate 3, respectively, in which the running grooves 44, 45, 51 are introduced directly into the lower side of the object 2 or the upper side of the carrier plate 3, respectively, in the embodiment variant shown in FIG. 5, the bearing regions 4, 5 are formed as separate elements in the form of bearing plates 42, 52, which are fastenable on the lower side of the object 2 or on the upper side of the carrier plate 3, respectively.

For this purpose, respective fastening receptacles 54, 47 are formed on lateral edges of the bearing plate 42, 52, into which screws are insertable, using which the bearing plates 42, 52 are fixable on the object 2 or on the carrier plate 3, respectively.

To keep the load on the roller bodies 6 as low as possible and simultaneously enable a simply constructed running groove, in the embodiment variant shown here, four such roller bodies 6 formed as balls are guided in the running grooves 44, 45, 51. Alternatively, two or eight roller bodies can also be provided.

As shown in FIGS. 4, 5, and 6, the closed peripheral running grooves 44, 45, 51 are introduced via the center point of the bearing region 4 of the object 2 and the bearing region 5 of the carrier plate 3 up into a front edge of the carrier plate 3 in the direction A of the translational movement of the object 2.

To be able to latch the object 2 easily in the starting position, in which the object 2 does not protrude over the front lateral edge of the carrier plate 3, the closed peripheral running grooves 44, 45, 51 comprise multiple catch points 43, 53 for the roller bodies 6 in the starting position. This starting position is reached after each rotation of the object 2 by 180°.

In a further embodiment, selected intermediate positions can also have catch points, for example, upon a pivot of the object 2 in relation to the carrier plate 3 by 90°.

The catch points 43, 53 are distinguished in that an elevated application of force is required for the movement out of these positions. This elevated applicant of force can be achieved, for example, by a corresponding formation of the running grooves 44, 45, 51 having depressions or elevated nubs or the like. Other elements for influencing the force, for example, magnets, are also conceivable.

In the formation of the running grooves 44, 45, 51 shown here, the object 2 is enabled to be rotatable in relation to the carrier plate 3 in a rotational direction $R_1$ and also in an opposing rotational direction $R_2$.

In addition, the object 2 can be rotated by arbitrary angles with this formation of the running grooves 44, 45, 51. It is thus possible to rotate the object 2 during a first rotational movement by 180° in relation to the carrier plate 3 in the rotational direction $R_1$ and during a subsequent actuation to rotate the object 2 once again in the same rotational direction $R_1$ or alternatively to rotate it in the opposing rotational direction $R_2$.

Figure 7:
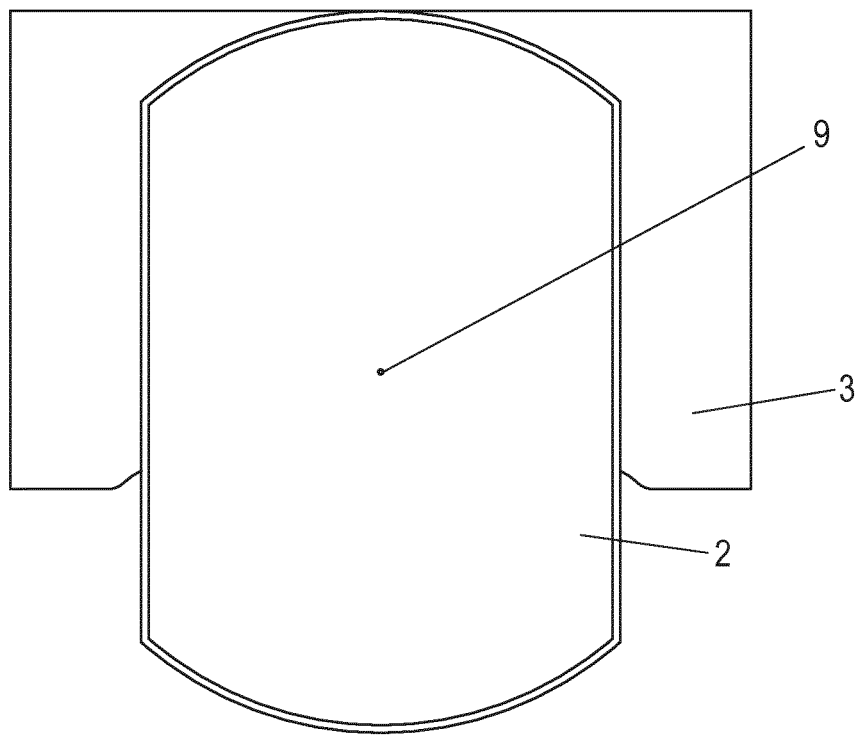
FIG. 7 shows a top view of the carrier plate having an object in an intermediate position.

It is apparent in FIG. 7 that the object 2 does not protrude opposite to the direction A over the rear edge of the carrier plate 3 in the intermediate position of approximately 90°.

The carrier plate 3 and the object 2 held thereon can be installed recumbent or also hanging or also standing vertically. In the recumbent installation position, the device may be used in this case for the translational and rotational movement of an object 2 designed as a shelf.

The invention claimed is:

1. A device for the rotational and translational movement of an object comprising a planar bearing region, the device comprising:
a carrier plate having a bearing region,
wherein the planar bearing region of the object is arranged plane-parallel to the bearing region of the carrier plate,
wherein the object is rotatable in relation to the carrier plate in one of two possible opposing rotational directions and is displaceable in a predetermined direction,
wherein bearing surfaces of the respective bearing regions facing toward one another each comprise at least one closed, peripheral running groove, in which roller bodies are guided, wherein the running grooves are formed in such a way that if a force acts on the object in the predetermined direction defined in the plane of the planar bearing region of the object, the object is movable in an at least partially positively-guided, simultaneously rotational and translational movement from a starting position into an intermediate position, during which the object is rotated in relation to the carrier plate in one of the two possible opposing rotational directions and is displaced in the predetermined direction, and wherein the object, after the movement into the intermediate position, is pivotable in relation to the carrier plate further in the one of the two possible opposing rotational directions and is displaceable opposite to the predetermined direction and occupies the base position again upon a pivot of 180°.

2. The device according to claim 1, wherein two closed, peripheral running grooves are introduced into one of the bearing regions and precisely one closed, peripheral running groove is introduced into the other of the bearing regions.

3. The device according to claim 1, wherein the roller bodies are formed as balls.

4. The device according to claim 1, wherein four of the roller bodies are positioned spaced apart from one another and are guided in the running grooves.

5. The device according to claim 1, wherein the roller bodies are held in a roller body cage.

6. The device according to claim 1, wherein the bearing regions are formed in one piece with the carrier plate or the object, respectively.

7. The device according to claim 1, wherein at least one of the bearing regions is formed as a separate element, which is insertable into a correspondingly shaped receptacle in the carrier plate or the object or is attachable by connecting means to the carrier plate or the object, respectively.

8. The device according to claim 1, wherein a guide is arranged in one of the bearing regions and a guiding and holding element is arranged in or on the other bearing region.

9. The device according to claim 1, wherein the closed peripheral running grooves are each introduced around the center point of the bearing region of the object and the bearing region of the carrier plate up to a front edge of the carrier plate in the predetermined direction of the translational movement of the object.

10. The device according to claim 1, wherein the closed peripheral running grooves have multiple catch points for the roller bodies in the base position, which are reached after each rotation of the object by 180°.

11. The device according to claim 1, wherein the object does not protrude over a rear edge of the carrier plate opposite to the predetermined direction of the translational movement of the object during the entire movement.

12. The device according to claim 1, wherein the object has at least two bearing regions, and interacts with more than one carrier plate.

13. The device according to claim 1, wherein the carrier plate is installable recumbent or hanging or standing vertically.

14. The device according to claim 5 wherein the roller bodies are held in the roller body cage captively.

15. The device of claim 1 wherein the running grooves are not parallel to each other.

* * * * *